United States Patent
Hua et al.

(10) Patent No.: US 7,359,315 B2
(45) Date of Patent: Apr. 15, 2008

(54) METHOD, SYSTEM, AND COMPUTER PROGRAM PRODUCT FOR AVOIDING DATA LOSS DURING NETWORK PORT RECOVERY PROCESSES

(75) Inventors: Binh K. Hua, Austin, TX (US); Hong Lam Hua, Austin, TX (US); Sivarama K. Kodukula, Round Rock, TX (US)

(73) Assignee: In-ernational Business Machines Corporation, Armonk, NY (US)

( * ) Notice: Subject to any disclaimer, the term of this patent is extended or adjusted under 35 U.S.C. 154(b) by 889 days.

(21) Appl. No.: 10/798,938

(22) Filed: Mar. 11, 2004

(65) Prior Publication Data
US 2005/0201271 A1   Sep. 15, 2005

(51) Int. Cl.
*H04J 1/16* (2006.01)
(52) U.S. Cl. .................. 370/216; 370/453; 370/457
(58) Field of Classification Search ........ 370/453–457, 370/216–228
See application file for complete search history.

(56) References Cited

U.S. PATENT DOCUMENTS

2004/0085894 A1* 5/2004 Wang et al. ................ 370/216
2005/0259575 A1* 11/2005 Krishnamurthi et al. .... 370/229

* cited by examiner

Primary Examiner—Chi Pham
Assistant Examiner—Thai Hoang
(74) Attorney, Agent, or Firm—Duke W. Yee; Mark E. McBurney; Lisa L. B. Yociss

(57) ABSTRACT

A method, system, and computer program product are disclosed in a data processing system for avoiding data loss during network port recovery. A first network port is linked to a second network port via a network. The second network port transmits data to the first network port via the network. A determination is made that the first network port needs to be reinitialized. Prior to the first network port executing a re-initialization process, the first network port notifies the second network port to pause its data transmissions to the first network port.

9 Claims, 2 Drawing Sheets

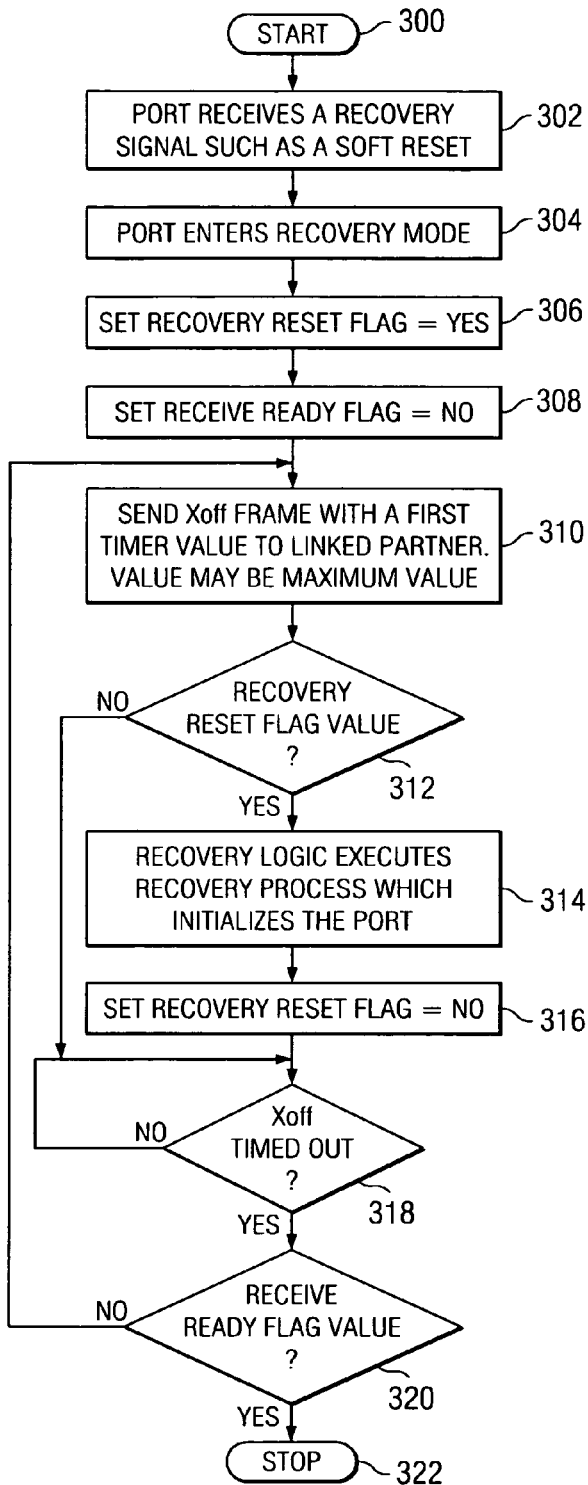
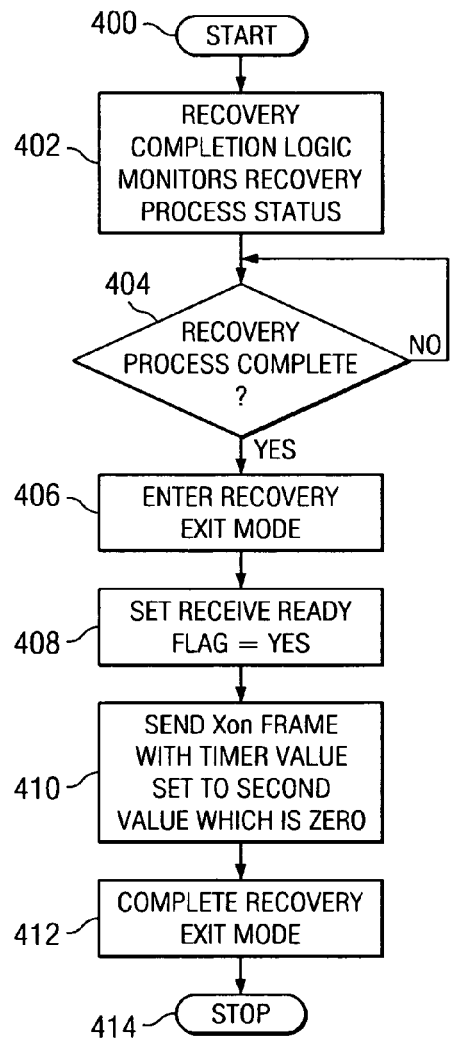
FIG. 3
FIG. 4

METHOD, SYSTEM, AND COMPUTER PROGRAM PRODUCT FOR AVOIDING DATA LOSS DURING NETWORK PORT RECOVERY PROCESSES

BACKGROUND OF THE INVENTION

1. Technical Field

The present invention is directed to data processing systems. More specifically, the present invention is directed to a method, system, and computer program product for avoiding data loss during a network port's recovery process.

2. Description of Related Art

In an ideal data processing system networking environment, the network ports, also called adapters, are operational at all times once they have been initialized and have addresses resolved. However, the reality is that often times a small number of ports experience some kind of port failure while in operation due to hardware or software defects. These failures may cause the port to hang, i.e. the port will not respond, in some cases. Once a port hangs, the port needs to complete a recovery process before it can become active and responsive again.

The known method to recover a port is to issue a soft reset to the port which will then cause the port to reinitialize itself. The process of reinitializing the port takes some period of time. During this time period of re-initialization, the port software and hardware are not ready or available to receive any packets from the network. Any packets sent to the port during this reinitialization process will be lost. To compound this problem, the system that transmitted the lost data to the port will be unaware that the intended recipient port is in a recovery mode and is not receiving the data.

A data processing system may be linked to another data processing system via the network in order to transmit data between these linked systems utilizing a network port in each system. When a first data processing system is linked to a second data processing system, the first data processing system will assume that because the systems are linked that the second system is ready to receive data via the second system's network port.

An Ethernet port includes a media access controller (MAC) and a network physical (PHY) layer. The logic to establish an Ethernet link connection between the ports is in the physical layer of the Ethernet port and is independent from the MAC and the device driver software that executes a recovery of the port. As soon as a port receives a power on signal or a soft reset signal, the PHY will start link negotiations with a second data processing system that is to become its linked partner. The link can be accomplished very quickly and long before the port software (device driver) and hardware (MAC) are ready to receive any data via the port. During the recovery period, there can be a significant data loss if the data keeps coming from the linked data processing system into the failed port.

Therefore, a need exists for a method, system, and computer program product for avoiding data loss during a network port recovery process.

SUMMARY OF THE INVENTION

A method, system, and computer program product are disclosed in a data processing system for avoiding data loss during a network port's recovery process. A first network port is linked to a second network port via a network. The second network port transmits data to the first network port via the network. A determination is made that the first network port needs to be reinitialized. Prior to the first network port executing a re-initialization process, the first network port notifies the second network port to pause its data transmissions to the first network port. The first network port may then complete its recovery process which includes reinitializing the first port. During the first port's recovery process, the second port will not send data to the first port. Once the first port has completed its recovery process, the first port will notify the second port that it may again send data to the first port.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates a high level flow chart that depicts a first network port transmitting a pause frame to a second network port before entering a recovery mode, where the pause frame causes the second network port that is linked to the first network port to pause its data transmissions to the first network port in accordance with the present invention; and FIG. 4 depicts a high level flow chart that illustrates a first network port executing a recovery exit process in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

To avoid any loss of data that is destined to a network port that is in a recovery mode, the present invention provides for sending a packet to the network port that is linked to the port in recovery. This packet is preferably an IEEE 802.3x flow control standard packet. A packet that conforms to this standard includes a settable timer value. When a port receives a packet that conforms to this standard, the port that receives the packet will pause its data transmissions to the port that sent the packet until the timer value included in the pause frame expires.

The present invention provides a method, system, and computer program product that detects a first network port entering a recovery mode process. This first network port is linked to a second network port via an Ethernet link standard process. After the first network port has entered a recovery mode process, but prior to beginning a re-initialization of the port, the first port will transmit a packet that conforms to the IEEE 802.3x flow control standard to the second port. Thus, the second port will pause its data transmissions to the first port until the timer value set by the packet has expired.

Once the first port sends its first pause packet, the first port will start its re-initialize process to re-initialize the first port. The first port will continue to send pause packets that conform to this 802.3x flow control standard until the first port has completed its recovery process and is reinitialized. When the first port has completed its recovery mode process and is reinitialized, the first port will then send another pause packet to the second port. This second packet has a timer set to a second value. This second value is preferably zero. When the second port receives this packet, it will pause for zero seconds before resuming its data transmissions to the first port. Thus, when the second port receives this second packet, it will resume transmitting data to the first port which is now again ready to receive the data after being reinitialized.

Figure 1:
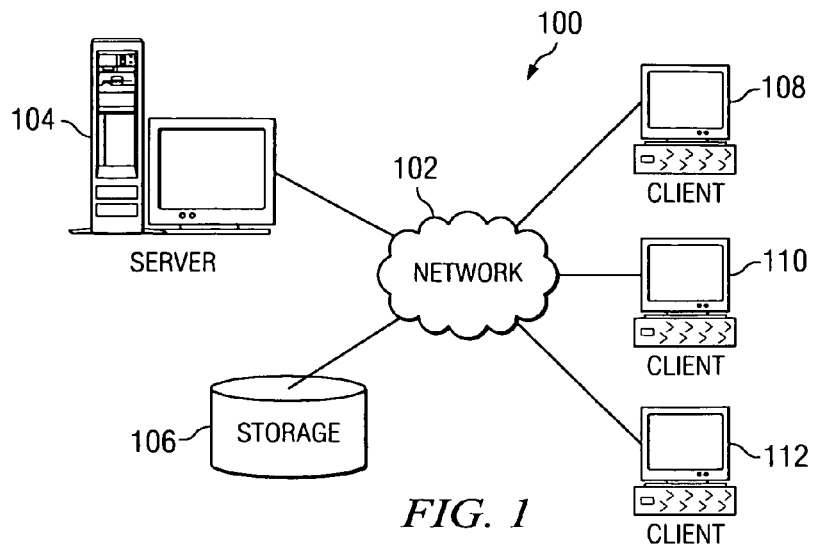
FIG. 1 is a pictorial representation which depicts a network of data processing systems in accordance with the present invention.

FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers, network computers, or other computing devices. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, network data processing system 100 also may be implemented as a number of different types of networks, such as for example, an intranet, a local area network (LAN), a wide area network (WAN), or a wireless network. FIG. 1 is intended as an example, and not as an architectural limitation for the present invention.

As described in more detail below, one of these computer systems, such as client 108 may be linked to another computer system, such as client 110. Thus, client 108 will include a network adapter or port that is linked to a network adapter that is included in client 110. These two clients 108, 110 are thus linked via network 102. Preferably, network 102 is an Ethernet network and the clients are linked via an Ethernet standard link.

In addition, each adapter includes recovery logic that includes flags that are used to indicate whether the adapter is currently ready to receive data transmissions from its linked network adapter that resides in the linked client. In addition, the adapter includes another flag that indicates whether a recovery process has been completed by the network adapter. Thus, a first network adapter uses these flags to determine whether to indicate to a second adapter that is linked to the first adapter to pause transmissions of data from the second adapter to the first adapter.

Figure 2:
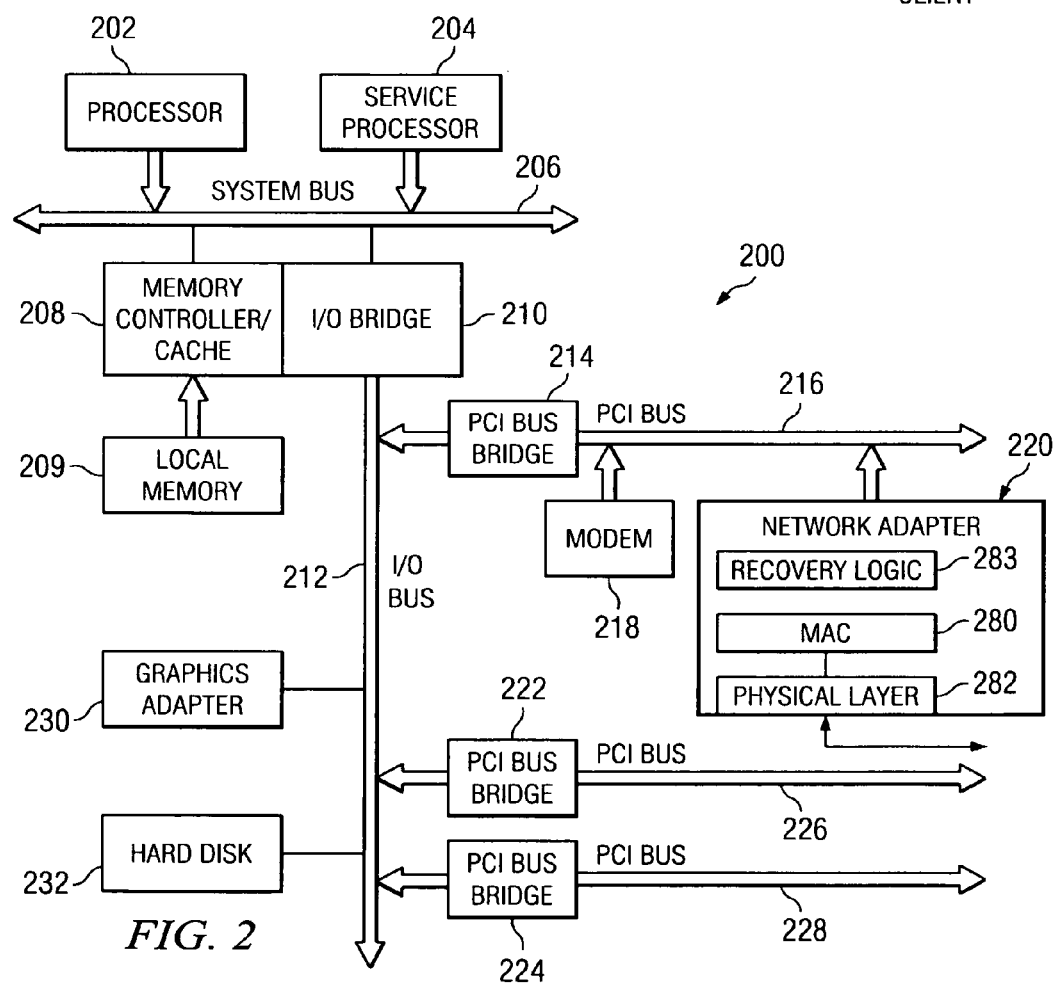
FIG. 2 is a more detailed illustration of a computer system that may be used to implement any of the computer systems of FIG. 1 in accordance with the present invention.

FIG. 2 is a more detailed illustration of a computer system that may be used to implement any of the computer systems of FIG. 1 in accordance with the present invention. Data processing system 200 may be a symmetric multiprocessor (SMP) system including a plurality of processors 202 and 204 connected to system bus 206. Alternatively, a single processor system may be employed. In the depicted example, processor 204 is a service processor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example an Ethernet network over an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Network adapter 220, also called network port, includes recovery logic 283. The recovery reset flag and receive ready flag described in more detail below may be either hardware flags, software flags, or a combination of both. If these flags are implemented in hardware, they will be included within recovery logic 283.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate an inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed by one of the computers depicted by FIG. 1 or 2.

FIG. 3 illustrates a high level flow chart that depicts a first network port transmitting a pause frame before entering a recovery mode, where the pause frame causes a second network port that is linked to the first network port to pause its data transmissions to the first network port in accordance with the present invention. The process starts as depicted by block 300 and thereafter passes to block 302 which illustrates a network port, also called a network adapter, such as network adapter 220, receiving a recovery signal, such as a soft reset.

The process then passes to block 304 which depicts the port entering the recovery mode. Next, block 306 illustrates setting a recovery reset flag equal to "yes". Thereafter, block 308 depicts setting a receive ready flag equal to "no". Block 310, then, illustrates the port sending an Xoff frame to the data processing system that includes the network port that is currently linked to the network port that sent this frame. This Xoff frame is a packet that adheres to the 802.3x flow control standard and includes a first timer value set to a first value. The first value is preferably a maximum value.

Next, block 312 depicts a determination of whether or not the recovery reset flag is equal to "yes" or to "no". If a determination is made that the recovery reset flag is currently set to "no", the process passes to block 318. Referring again to block 312, if a determination is made that the recovery reset flag is currently set to "yes", the process passes to block 314 which illustrates the recovery logic executing the normal recovery process which initializes the port.

The process then passes to block 316 which depicts setting the recovery reset flag equal to "no". Next, block 318 illustrates a determination of whether or not the time in the Xoff frame has expired. This is referred to as the Xoff timer being "timed out". If a determination is made that the Xoff frame has not timed out, i.e. there is still time remaining in the timer value, the process passes back to block 318. Referring again to block 318, if a determination is made that the Xoff frame has timed out, the process passes to block 320.

Block 320 depicts a determination of whether or not the receive ready flag value is currently "yes" or "no". If a determination is made that the receive ready flag is set to "no", the process passes back to block 310. Thus, another Xoff frame having a timer set to a maximum value will be sent to the linked port. This loop will continue sending out multiple Xoff frames until the receive ready flag is set to "yes". Referring again to block 320, if a determination is made that the receive ready flag is current set to "yes", the process terminates as illustrated by block 322.

FIG. 4 depicts a high level flow chart that illustrates a first network port executing a recovery exit process in accordance with the present invention. The process starts as depicted by block 400 and thereafter passes to block 402 which illustrates the recovery completion logic monitoring recovery process status by continually monitoring the recovery reset flag. When the recovery process is complete, the recovery reset flag will be set to "no".

Next, block 404 depicts a determination of whether or not the recovery process is complete. If a determination is made that the recovery process is not complete, i.e. the recovery reset flag is equal to "yes", the process passes back to block 404 until which time as the recovery reset flag becomes equal to "no". Referring again to block 404, if a determination is made that the recovery process is complete, i.e. the recovery reset flag is equal to "no", the process passes to block 406 which illustrates entering the recovery exit mode. Thereafter, block 408 depicts setting the receive ready flag equal to "yes". Block 410, then, illustrates sending an Xon frame to the linked port with a timer value set to a second value. This second value is preferably zero. Thereafter, block 412 depicts a completion of the recovery exit mode. The process then terminates as illustrated by block 414.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for avoiding data loss during network port recovery, said method comprising:
   linking a first network port to a second network port via a network, said second network port transmitting data to said first network port via said network;
   determining that said first network port needs to be reinitialized; and
   prior to said first network port executing a reinitialization process, notifying, by said first network port, said second network port to pause its data transmissions to said first network port.

2. The method according to claim 1, further comprising the steps of:
   pausing, by said second network port, data transmissions to said first network port.

3. The method according to claim 1, further comprising the steps of:
   pausing, by said second network port, data transmissions to said first network port;
   determining that said first network port has completed its reinitialization process; and
   notifying, by said first network port, said second network port to resume its data transmissions to said first network port.

4. The method according to claim 1, further comprising the steps of:
   executing, by said first network port, a re-initialization process while said second network port pauses its data transmissions to said first network port.

5. The method according to claim 1, further comprising the steps of:
provinding, by said first network port, a timer value to said second network port prior to said first network port beginning its re-initialization process; and
pausing, by said second network port, data transmissions to said first network port until said timer value expires.

6. The method according claim 5, further comprising the steps of:
determining that said timer value has expired;
in response to determining that said timer value has expired, determining whether said first network port has completed its re-initialization process;
in response to a determination that said first network port has not completed its re-initialization process, providing a second timer value to said second network port; and
pausing, by said second network port, data transmissions to said first network port until said second timer value expires.

7. The method according to claim 5, further comprising the steps of:
determining that said timer value has expired;
in response to determining that said timer value has expired, determining whether said first network port has completed its re-initialization process;
in response to a determination that said first network port has completed its re-initialization process, providing a third timer value to said second network port;
resuming, by said second network port, data transmissions to said first network port upon a receipt of said third timer value.

8. The method according to claim 7, further comprising the steps of:
said third timer value being a value of zero.

9. The method according to claim 1, further comprising the steps of:
determining whether said first network port has begun its re-initialization process by checking a current setting of a first flag.

* * * * *